United States Patent [19]

Livingston et al.

[11] Patent Number: 4,587,116
[45] Date of Patent: May 6, 1986

[54] PROCESS FOR TREATING CHLORINATED NITROGEN-CONTAINING HYDROCARBONS

[75] Inventors: Dana A. Livingston, Pittsburg; Joseph P. Surls, Jr., Walnut Creek, both of Calif.

[73] Assignee: The Dow Chemical Company, Midland, Mich.

[21] Appl. No.: 577,441

[22] Filed: Feb. 6, 1984

[51] Int. Cl.$^4$ .................. C01B 31/18; C01B 31/20
[52] U.S. Cl. .................. 423/415 A; 423/437; 423/472; 423/492; 423/493; 423/494; 423/495
[58] Field of Search .................. 429/491–496, 429/437, 415 A, 472

[56] References Cited

U.S. PATENT DOCUMENTS

| | | |
|---|---|---|
| 2,486,912 | 11/1949 | Belchetz . |
| 3,305,300 | 2/1967 | McBrayer . |
| 3,481,697 | 12/1969 | Figuet et al. .................. 423/492 |
| 3,963,585 | 6/1976 | Winter et al. .................. 423/492 |
| 4,003,711 | 1/1977 | Hishinuma . |
| 4,085,193 | 4/1978 | Nakajima et al. . |
| 4,104,360 | 8/1978 | Meguerian et al. . |
| 4,151,123 | 4/1979 | McCann . |
| 4,378,338 | 3/1983 | Imanari et al. . |
| 4,435,379 | 3/1984 | Olson et al. .................. 423/492 |

FOREIGN PATENT DOCUMENTS 2311213  7/1974  Fed. Rep. of Germany .
 150189  8/1981  German Democratic Rep. .

OTHER PUBLICATIONS

Kirk–Othmer, "Encyclopedia of Chemical Technology", 3d. ed., vol. 5, p. 696, (1980).
Greenfield et al., United Kingdom Atomic Energy Authority Research Report No. AERE–R4149 (1962).
Silber, "Nouveau Traite de Chimie Minerale", vol. 4, (1958).
Atkinson et al., "Analytical Chemistry", vol. 24, No. 3, pp. 480–488 (1952).
Bardainl et al., "Jour. of the Less–Common Metals", vol. 9, pp. 20–24 (1965).
Chem. Abst. 95:206,185; (1981).
Clark, "Chemistry of Titanium and Vanadium", pp. 28–29 (1968).

*Primary Examiner*—T. Tung

[57] ABSTRACT

A process is described for reacting chlorinated, nitrogen-containing hydrocarbons with metal oxides so as to convert essentially all of the carbon atoms to oxides of carbon. This process provides an efficient and economically valuable use for chlorinated, nitrogen-containing hydrocarbons.

15 Claims, No Drawings

PROCESS FOR TREATING CHLORINATED NITROGEN-CONTAINING HYDROCARBONS

BACKGROUND OF THE INVENTION

This is a novel process for converting chlorinated, nitrogen-containing hydrocarbons to metal chlorides, nitrogen and oxides of carbon.

In the synthesis of certain agricultural chemicals and other chemical products, chlorinated nitrogen-containing hydrocarbons co-products are obtained other than those desired. If these co-products do not have a defined commercial use, they are conventionally handled by thermal oxidation. However, such operations are generally expensive in part because of the fuel required to sustain combustion. Moreover, nitrogen oxides of the formula $NO_x$ wherein x is the integer 1 or 2 and other undesirable by-products may be produced. Accordingly, it would be desirable to have a method of converting chlorinated, nitrogen-containing hydrocarbons to useful products.

U.S. Pat. No. 2,486,912 teaches that carbon tetrachloride can be reacted with titanium dioxide to yield titanium tetrachloride and oxides of carbon. However, other chlorinated hydrocarbons are generally recognized to be much less reactive. The treatment of nitrogen-containing compounds using this method has not been described.

Unexpectedly, it has now been found that by maintaining the apparatus ratio of carbon to available oxygen, chlorinated hydrocarbons containing nitrogen will essentially completely react with a suitable refractory metal oxide without producing significant quantities of oxides of nitrogen.

SUMMARY OF THE INVENTION

According to this invention, a chlorinated, nitrogen-containing hydrocarbon is converted to a metal chloride or metal oxychloride, nitrogen gas and an oxide of carbon by reaction with a suitable refractory metal oxide. This process comprises the step of contacting at reactive conditions at least one chlorinated, nitrogen-containing hydrocarbon with a sufficient quantity of the refractory metal oxide and chlorine or oxygen to convert essentially all (at least 90 percent) of the carbon atoms present in the chlorinated hydrocarbon to carbon monoxide or carbon dioxide.

DETAILED DESCRIPTION OF THE INVENTION

The chlorinated hydrocarbons reacted in the subject process are part of a large, but well known class of compounds. These compounds include any known compound corresponding to the formula, $C_aH_bCl_cN_dBr_eO_f$, wherein "a", "c" and "d" are each independently an integer greater than 0 and "b", "e" and "f" are each independently an integer equal to at least 0. However, mixtures of said chlorinated, nitrogen-containing hydrocarbons, including mixtures with $CCl_4$ or other simple chlorinated hydrocarbons, may also be employed.

Preferably, in the formula $C_aH_bCl_cN_dBr_eO_f$, preferably b=0 and e=0. Also, preferably f=0. Preferred chlorinated, nitrogen-containing hydrocarbons include chlorinated picolines, pyridines, pyrazines and amines. Especially preferred are aromatic chlorinated, nitrogen-containing hydrocarbons, such as pentachloropyridine.

The refractory metal oxides to be reacted with the chlorinated hydrocarbons are also known in the art. See, e.g., Kirk-Othmer, Encyclopedia of Chemical Technology, 2nd Ed., Vol. 17, pp. 227-267 (1968). Oxides of metals selected from Groups IVb, Vb, VIb, VIIb, IIIa and IVa (excluding carbon, of course) of the standard periodic table of the elements and oxides of beryllium, magnesium, thorium and uranium are in general operable.

From a thermodynamic standpoint, the metal chloride or oxychloride derived by chlorination of the metal oxide or mixture of oxides as a starting material typically will possess a more positive Gibb's free energy of formation at temperatures in the desired operating range (e.g., 500° to 1200° C.) on a balanced chemical equivalent basis than the starting materials. That is, the metal oxide generally cannot be chlorinated with chlorine in the absence of a carbon-containing mateial with is contemporaneously oxidized. However, iron oxide is an exception. Generally, the free energy of formation per equivalent of oxygen in a mole of the metal oxide starting material should not be substantially more negative (i.e., an absolute difference of more than 47,000 calories at 500° C. or 58,000 calories at 1200° C.) than the free energy of formation on a molar basis of the metal chloride or the metal oxychloride product per two atoms of chlorine present in the chemical formula of the product. The necessary free energy data to evaluate the thermodynamics of the reaction is available in "JANAF Thermochemial Tables", (available as National Bureau of Standards Publication 37) and other similar compilations.

Any bromine substituents present on the chlorinated hydrocarbon generally wil react with the metal oxide to form metal bromide or other bromine-containing metal salts, such as metal salts containing both bromide and chloride moieties.

In general, metal oxides are preferred but partially chlorinated derivatives of these oxides can also be employed and may be formed in situ during chlorination of the metal oxide. The operable metal oxides include oxides of titanium (IV), aluminum (III), iron (II and III), zirconium (IV), tin (II and IV), vanadium (III, IV and V) and chromium (III and IV). Titanium dioxide and aluminum oxide ($Al_2O_3$) are preferred as metal oxides. The metal oxides can be employed in a refined state. Generally, metal oxides present in a crude mineral ore are operable and less expensive than the refined material. These mineral ores optionally can include silica ($SiO_2$) or silicates. Alternatively, the metal oxide can be partially hydrated; activated alumina is an example of such a hydrate. Illustrative ores include fosterite, spinel, zircon and mullite. Preferred are rutile or ilmenite mineral ores.

Advantageously, sufficient oxygen is available for reaction such that at least about one atom of oxygen is present for each atom of carbon introduced. Optionally, but less preferably, a less than stoichiometric amount of oxygen can be employed and some carbon will be formed. The oxygen involved in the reaction can be released by the metal oxide, if sufficient chlorine and bromine moieties are borne by the chlorinated, nitrogen-containing hydrocarbon to displace a stoichiometric quantity of oxygen. Alternatively, an oxygen-containing gas (e.g., air) can be introduced to the reaction mixture to provide additional oxygen directly or chlorine can be introduced to release additional oxygen from the metal oxide. A mixture of oxygen and chlorine gases can also be employed.

Preferably, the ratio of carbon atoms to oxygen atoms available for reaction is in the range from about 1:1 to about 2:1. An excess of available oxygen may result in chlorine gas or oxides of nitrogen being produced, while carbon may form at ratios less than stoichiometric. The oxygen available is the total of the oxygen introduced together with the oxygen released by the metal oxide or other oxygen-containing compound present in reaction with the chlorine introduced and the chlorine (and bromine if present) from the chorinated, nitrogen-containing hydrocarbon. Carbon or hydrocarbons may optionally be introduced along with or preceding the chlorinated, nitrogen-containing hydrocarbon and oxidized to aid in achieving or maintaining the desired operating temperature.

In one preferred embodiment of the invention, the nitrogen-containing, chlorinated hydrocarbon is introduced along with chlorine or air in an otherwise conventional process for converting metal oxides to metal chlorides. In this embodiment, the solids in the reaction zone will generally comprise from about 10 to about 90 weight percent, more preferably about 35 to about 60 weight percent, of metal oxide and a remaining amount of carbon. To this reaction zone is added air or chlorine containing a nitrogen-containing, chlorinated hydrocarbon. The chlorinated hydrocarbon thereby provides a significant fraction of both chlorine and carbon required in the reaction. Other chlorinated hydrocarbons can optionally be introduced into the reaction zone, for example, hexachlorobenzene. In one embodiment of the invention chlorinated hydrocarbons recovered from the product gases can be recycled for reaction with the metal oxide.

It is important that sufficient chlorine be present to convert any hydrogen moieties present on the chlorinated hydrocarbon to hydrogen chloride. The hydrogen chloride can be conveniently separated from the product gases via conventional methods. In some instances it may be desirable to add hydrogen, hydrocarbons or water so that additional hydrogen chloride is produced. At least about a stoichiometric quantity or preferably an excess of metal oxide should be present to ensure essentially complete reaction of the chlorine moieties derived from the chlorinated hydrocarbon. In general, the hydrogen moieties from the hydrocarbon feed are more reactive toward chlorine than are metal oxides. Accordingly, the overall ratio of chlorine to hydrogen moieties must be at least 1:1 if any metal chloride is to be produced.

The nitrogen present in the chlorinated hydrocarbon is believed to initially form NO or $NO_2$. However, these oxides of nitrogen react rapidly with carbon monoxide in the presence of the metal oxide or metal chloride to produce nitrogen and carbon dioxide. Consequently, the gaseous product typically contains unexpectedly low concentrations of oxides of nitrogen. Generally, less than 0.1 percent, more preferably less than 0.001 percent, of the nitrogen present in the chlorinated hydrocarbon feed exits from the metal oxide bed as NO or $NO_2$.

In one embodiment of the subject process, the chlorinated, nitrogen-containing hydrocarbon and the oxygen or chlorine gases are first preheated as a mixture or separately to vaporize the chlorinated hydrocarbon. These reactants can be preheated in any conventional manner known in the art. Preferably, at least part of the heat is derived from heat exchange with the product gases once the process is underway. Alternatively, a liquid or solid chlorinated, nitrogen-containing hydrocarbon can be employed by introducing it directly to a heated metal oxide bed, where it is vaporized, sublimed or reacted directly.

The chlorinated, nitrogen-containing hydrocarbon and the oxygen or chlorine gas optionally together with a gas essentially inert in the reaction, such as nitrogen, are introduced to a packed or fluidized bed of the refractory metal oxide. Desirably, the metal oxide is present in particles having a high surface to volume ratio, but not so small that the gas flow is deleteriously impeded. Particles of from about 24 to about 325 U.S. Sieve size are preferred. An essentially inert packing material can also be employed to provide improved flow distribution of the gases.

The temperature during contact between the chlorinated, nitrogen-containing hydrocarbon and the metal oxide is advantageously in the range from about 500° to about 1200° C., more preferably about 900° to about 1100° C. Temperatures below about 700° C. generally result in undesirably slow reaction rates. Temperatures above about 1200° C. are not necessary and can necessitate the use of expensive materials in the reactor and associated equipment.

At the aforementioned reaction temperatures the reaction rate will generally be fairly rapid. Accordingly, a residence time of less than 1 second in the reaction zone will typically effect essentially complete conversion of most chlorinated, nitrogen-containing hydrocarbons. Residence times of up to one minute may be necessary under less preferred conditions. Of course, the actual reaction time may be somewhat longer or may be as brief as 0.01 second depending on the specific metal oxide, the reaction temperature, the size of the metal oxide particles, the identity of the chlorinated hydrocarbon and other factors.

The pressure in the reaction zone is not generally critical. An absolute pressure of from about 0.1 to about 10 atmospheres is convenient, with a pressure of about 1 atmosphere being preferred.

The metal chloride or metal oxychloride produced in the preferred embodiments of the subject process have a greater value than the starting metal oxide. The metal chloride can be recovered by techniques known in the prior art. Preferred are metal chlorides which vaporize or sublime at the instant reaction conditions and can be recovered readily from the product gas stream by condensation. It is desirable to employ an excess of metal oxide in the subject process to prevent breakthrough of the chlorinated, nitrogen-containing hydrocarbon through the reaction bed. Conveniently, this process is conducted continuously by introducing additional metal oxide to the reaction zone as metal chloride departs in the gas phase.

The following examples are presented to further illustrate the invention. All parts and percentages are by weight unless indicated otherwise. All gas volumes were measured for standard temperature and pressure conditions.

EXAMPLE 1

A horizontal quartz tube having an inside diameter of 11 millimeters was packed with rutile ore in a five-inch long section. The tube was heated to 1000° C. 2.43 Milliliters (ml) per minute of 2,3,5,6-tetrachloropyridine and 20.0 ml of air were premixed, heated to 219° C. and passed through the rutile bed. The gas feed was continued for 125 minutes.

The composition of the gas leaving the rutile bed was monitored by conventional techniques. This product gas typically consisted of 57 percent $N_2$, 1 percent $O_2$ or Argon, 33 percent CO and 9 percent $CO_2$. From the product gas was collected 1.96 grams of $TiCl_4$. No oxides of nitrogen were detected in the gas.

EXAMPLE 2

A horizontal quartz tube having an inside diameter of 11 millimeters was packed with rutile in a three-inch long section. The tube was heated to 925° C. A gas stream consisting of 7.41 ml per minute of 2,3,5,6-tetrachloropyridine, 24.5 ml per minute $Cl_2$ and 25.5 ml per minute helium was premixed, heated to 295° C. and passed through the rutile bed. This gas feed was continued for 258 minutes.

The composition of the gases other than helium leaving the rutile bed was determined by conventional techniques. This product gas excluding the helium present typically consisted of 42 percent CO, 50 percent $CO_2$, 7.4 percent $N_2$ and 0.6 percent $N_2O$. It should be noted that $N_2O$ is generally considered relatively innocuous compared to $NO_x$. No NO or $NO_2$ was detected. From the product gas was collected 7.96 grams of $TiCl_4$.

What is claimed is:

1. A process for using a chlorinated, nitrogen-containing hydrocarbon to produce a metal chloride or metal oxychloride comprising the step of:

contacting at reactive conditions at least one chlorinated, nitrogen-containing hydrocarbon of the formula $C_aH_bCl_cN_dBr_eO_f$, wherein "a", "c" and "d" are each independently integers greater than 0, and "b", "e" and "f" are each independently integers equal to at least 0, with a sufficient quantity of a suitable refractory metal oxide and a sufficiently quantity of chlorine or a mixture of chlorine and oxygen to convert essentially all of the carbon atoms of the chlorinated hydrocarbon to carbon monoxide or carbon dioxide.

2. The process as described in claim 1 wherein no more than 0.1 percent of the nitrogen atoms present in the chlorinated hydrocarbon are converted to oxides of nitrogen which leave the zone containing the metal oxide, metal chloride and metal oxychloride.

3. The process as described in claim 1 wherein the metal oxide is selected from oxides of titanium (IV), aluminum (III), iron (II and III), zirconium (IV), tin (II and IV), vanadium (III, IV and V) and chromium (III and IV).

4. The process as described in claim 1 wherein the metal oxide is titanium dioxide or an aluminum oxide.

5. The process as described in claim 4 wherein the metal oxide is rutile or ilmenite.

6. The process as described in claim 4 wherein the chlorinated hydrocarbon is a chlorinated pyridine or picoline.

7. The process as described in claim 1 wherein the chlorinated, nitrogen-containing hydrocarbon includes at least one aryl moiety.

8. The process as described in claim 1 wherein in the formula $C_aH_bCl_cN_dBr_eO_f$, b=0 and e=0.

9. The process as described in claim 8 wherein f=0.

10. The process as described in claim 8 wherein the chlorinated hydrocarbon is pentachloropyridine.

11. The process as described in claim 9 wherein the metal oxide is aluminum oxide or titanium dioxide.

12. The process as described in claim 1 wherein the metal oxide is present as a mineral ore which includes silica or a silicate.

13. The process as described in claim 1 wherein the ratio of total carbon atoms present to oxygen atoms available for reaction should be in the range from about 1:1 to about 1:2.

14. The process as described in claim 11 wherein the reaction temperature is in the range from 900° to 1100° C.

15. The process as described in claim 14 wherein chlorine gas, but not oxygen, is introduced into the reaction zone.

* * * * *